United States Patent [19]

Ely et al

[11] Patent Number: 5,003,464
[45] Date of Patent: Mar. 26, 1991

[54] METHODS AND APPARATUS FOR EFFICIENT RESOURCE ALLOCATION

[75] Inventors: Thomas C. Ely, Bridgewater; Walter L. Rively, Colonia; Dariuz A. Smyk, Piscataway, all of N.J.

[73] Assignee: Bell Communications Research, Inc., Livingston, N.J.

[21] Appl. No.: 197,283

[22] Filed: May 23, 1988

[51] Int. Cl.[5] .................... G06F 15/16; G06F 13/00
[52] U.S. Cl. ............................. 364/200; 364/230.3; 364/230.4; 364/281.3; 364/228; 371/11.3
[58] Field of Search ... 364/200 MS File, 900 MS File, 364/300, 131; 371/11, 11.2, 11.39.1, 18

[56] References Cited

U.S. PATENT DOCUMENTS

| | | | |
|---|---|---|---|
| 3,683,418 | 8/1972 | Martin | 364/200 |
| 3,812,468 | 5/1974 | Wollum et al. | 364/200 |
| 4,219,873 | 8/1980 | Kober et al. | 364/200 |
| 4,375,639 | 3/1983 | Johnson, Jr. | 364/200 |
| 4,466,063 | 8/1984 | Segarra et al. | 364/200 |
| 4,499,538 | 2/1985 | Finger et al. | 364/200 |
| 4,503,535 | 3/1985 | Budde et al. | 371/11.3 |
| 4,543,626 | 9/1985 | Bean et al. | 364/200 |
| 4,571,672 | 2/1986 | Hatada et al. | 364/200 |
| 4,574,350 | 3/1986 | Starr | 364/200 |
| 4,608,631 | 8/1986 | Stiffler et al. | 364/200 |
| 4,635,184 | 1/1987 | Schuss | 371/9.1 |
| 4,716,528 | 12/1987 | Erms et al. | 364/200 |
| 4,719,569 | 1/1988 | Ludemann et al. | 364/200 |
| 4,729,124 | 3/1988 | Hansel et al. | 371/18 |
| 4,730,268 | 3/1988 | Marin | 364/900 |
| 4,757,442 | 7/1988 | Sakata | 364/200 |
| 4,805,085 | 2/1989 | Mogi et al. | 371/9.1 |
| 4,807,226 | 2/1989 | Naka | 371/8 |
| 4,817,091 | 3/1989 | Katzman et al. | 371/11.3 |
| 4,907,232 | 3/1990 | Harper et al. | 371/11.3 |
| 4,937,733 | 6/1990 | Gillet, Jr. et al. | 364/200 |

OTHER PUBLICATIONS

"Auditor: A Framework for High Availability of DB/DC Systems", W. Kim, 1982 IEEE 76,1982.
"Elections in a Distributed Computing System", II. Garcia-Maonima, IEEE Trans. on Computers, vol. C-31, No. 1, Jan. 1982.
"Hierarchical Ordering of Sequential Processes", E. W. Dijkstra, Acta Informatica, vol. 1, No. 2, pp. 115-138, 1971.
"Specification and Proof Techniques for Serializers", R. Atkinson et al., Report of the MIT Artificial Intelligence Laboratory, Cambridge, Mass., Aug. 1977.
"Monitors: An Operating System Structuring Concept", C. A. R. Hoare, Communications of the ACM, vol. 17, No. 10, pp. 549-557, Oct. 1974.
"Process Structuring, Synchronization, and Recovery Using Atomic Actions", D. B. Lomet, Proc. of the ACM Conf. on Language Design for Reliable Software, SIGPLAN Notices, vol. R, No. 3, pp. 128-137, Mar. 1977.
"An Optimal Algorithm for Mutual Exclusion in Computer Networks", G. Ricart et al., Communications of the ACM, vol. 24, No. 1, pp. 9-17, Jan. 1981.
"Time, Clocks and the Ordering of Events in a Distributed System", L. Lamport, Communications of the ACM, vol. 24, No. 7, pp. 558-565, Jul. 1978.

Primary Examiner—Michael R. Fleming
Assistant Examiner—Gopal C. Ray
Attorney, Agent, or Firm—James W. Falk

[57] ABSTRACT

A multiprocessor data processing system is described in which the function of coordinating the actions of all of the processors of the multiprocessor system can be assigned to any one of the processors of the system. In order to ensure assignment of the coordinator function to one, and only one, of the processors, particularly in the presence of failures, a standard multiprocessor resource assignment procedure is used. To this end, the right to the assignment of the coordinator function is treated as an exclusively used system resource. Each CPU requests the coordinator function and the already available resource assignment procedure assigns the coordinator function to the requester at the top of a requestor queue. Exclusive assignment of the coordinator function is thereby accomplished regardless of the number, order or timing of component failures, and without the necessity of providing a separate coordination assignment facility.

2 Claims, 3 Drawing Sheets

COORDINATOR ELECTION

METHODS AND APPARATUS FOR EFFICIENT RESOURCE ALLOCATION

TECHNICAL FIELD

This invention relates to multiprocessor distributed computing systems and, more particularly, to the coordination of a plurality of processors in the performance of complex data processing functions.

BACKGROUND OF THE INVENTION

Distributed processing systems are computer data processing systems which use a plurality of digital processing units, whether geographically co-located or not, to perform complex data processing functions. When a single, or a plurality of related, data processing tasks are distributed among a plurality of hardware processing units, it is necessary to coordinate the data processing tasks to insure that intermediate results are available before initiating subsequent tasks using those results. It is also necessary to redo tasks the results of which are lost due to processor failure, to isolate failed hardware units and to recover from software errors and hardware faults.

In some distributed processing systems, the job of coordinating the plurality of processors is distributed or decentralized. In these decentralized systems, all processors perform identical functions and coordinate with the other processors by means of messages exchanged with these other processors. Such decentralized control systems are difficult to design and susceptible to failures in any one of the processors. This problem is overcome in centrally-controlled distributed processing systems, where one of the processors, under program control, is used to coordinate the activities of all of the other processors. However, since a failure of the coordinating processor renders the entire multiprocessing system unavailable, it is desirable to duplicate the coordinating capability in all of the processors. It is then necessary to assign the coordinating responsibility to an operative one of the processors at start-up or upon failure of the current coordinating processor.

It is therefore necessary in distributed processing systems with centralized control to provide a dynamic protocol or strategy for designating one, and only one, of the processors as the coordinating processor. Moreover, this strategy, and the mechanisms embodying the strategy, must be capable of assigning, at any time, one and only one processor as the coordinating processor, even in the presence of multiple, concurrent errors or failures.

Unfortunately, presently available systems for assigning the coordinating processor are complex, expensive and subject to multiple error failures. Such algorithms are described in "Auditor: A Framework for High Availability of DB/DC Systems" by W. Kim, *IEEE* 1982, and "Elections in a Distributed Computing System" by H. Garcia-Monina, *IEEE Trans. on Computers*, Vol. C-31, No. 1, January, 1982.

SUMMARY OF THE INVENTION

In accordance with the illustrative embodiment of the present invention, these and other problems are solved by treating the right to coordinate the plural processors in a multiprocessor system as a one-user-at-a-time resource. The assignment of this resource to a unique processor can then be controlled by standard, well-known mutual exclusion resource access and lockout facilities. More specifically, existing and well-understood resource lockout systems, including request queuing, concurrent error handling and one-at-a-time assignment capabilities, can be utilized. One resource lockout system suitable for use with the present invention is disclosed in R. L. Martin U.S. Pat. No. 3,683,418, granted Aug. 8, 1972. Other examples of some of the existing data lockout systems are described in "Hierarchical Ordering of Sequential Processes," by E. W. Dijkstra, published in *Acta Informatica*, Volume 1, Number 2, 1971, pages 115-138; "Specification and Proof Techniques for Serializers" by R. Atkinson and C. Hewitt, *Report of the MIT Artificial Intelligence Laboratory*, Cambridge, MA, August 1977; "Monitors: An Operating System Structuring Concept," by C. A. R. Hoare, published in *Communications of the ACM*, Volume 17, Number 10, October 1974, pages 549-557; "Process Structuring, Synchronization, and Recovery Using Atomic Actions," by D. B. Lomet, published in the *Proceedings of the ACM Conference on Language Design for Reliable Software*, SIGPLAN Notices, Volume 12, Number 3, March 1977, pages 128-137; *Operating System Principles*, by Brinch Hansen, Prentice Hall, Englewood Cliffs, NJ, 1973; "An Optimal Algorithm for Mutual Exclusion in Computer Networks", *Communications of the ACM*, Volume 24, Number 1, January 1981, pages 9-17, and "Time, Clocks and the Ordering of Events in a Distributed System", *Communications of the ACM*, Volume 24, Number 7, July 1978, pages 558-565. One particularly simple mutual exclusion lockout algorithm, which will be disclosed in connection with the present invention is disclosed on pages 56 and 57 of the text *Algorithms for Mutual Exclusion* by M. Raynal, The MIT Press, Cambridge, MA, 1986.

The major advantage of the present invention is obtaining all of the benefits of well-known and largely debugged software lockout systems for one of the most complex control functions in new distributed multiprocessor systems without the expenditure of concomitant development effort.

BRIEF DESCRIPTION OF THE DRAWINGS

A complete understanding of the present invention may be gained by considering the following detailed description in conjunction with the accompanying drawing, in which.

To facilitate reader understanding, identical reference numerals are used to designate elements common to the figures.

DETAILED DESCRIPTION

Figure 1:
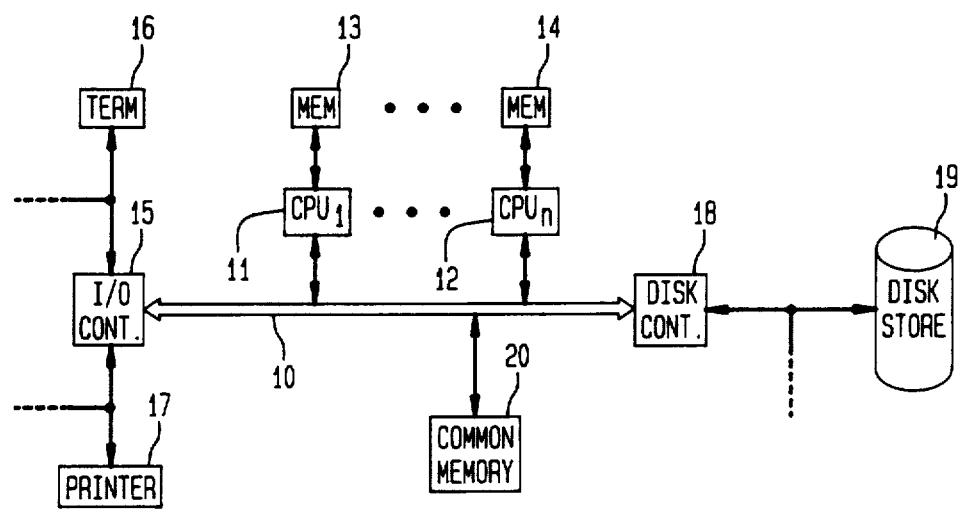
FIG. 1 shows a general block diagram of the hardware architecture for a multiprocessor computer system in which the present invention might find use.

In FIG. 1 there is shown a general block diagram of a computer multiprocessing system comprising a signal transfer bus 10 to which are connected a plurality of other components of the system. The bus 10 is a multibit, time-shared communication facility used to communicate, in time division multiplex, between any two of the system components connected to bus 10.

Connected to bus 10 are a plurality of computer central processing units (CPUs) 11, . . . 12, each associated with a corresponding memory unit 13, . . . 14. The CPUs 11-12 are all identical and each performs a portion of a single multiprogrammed task. Programs and CPU-dependent data are stored in the per CPU memories 13-14, each CPU having access to its own associated memory 13-14. Memories 13-14 may comprise programmable read-only memories (PROMs), random access memories (RAMs), or both. In any event, CPUs 11—12 are arranged to execute appropriate programs to carry out a portion of the overall data processing task assigned to the multiprocessing system of FIG. 1, all as is well known in the prior art.

Also connected to bus 10 is an input-output controller 15 which serves to interface the CPUs 11-12 to peripheral devices such as terminal 16 and printer 17. Other forms of peripheral devices are well-known and will not be further described here. Likewise connected to bus 10 is a disk controller 18 which serves to interface the CPUs 11-12 to high capacity magnetic storage disks such as disk store 19. Programs and data with a long lifetime are stored on disks 19 for retrieval whenever requested by one of CPUs 11-12.

A common memory 20 may also be connected to bus 10 to store data and programs which are used by all of CPUs 11-12. As is well-known, CPUs 11-12 may access memory 20 via bus 10 to store or retrieve information whenever desired.

A multiprocessing system such as that shown in FIG. 1 must divide the overall data processing tasks into a plurality of sub-tasks each of which is done by one of the CPUs 11-12. The goal of the multiprocessing system is to execute a large number of sub-tasks in parallel to thereby increase the speed at which the overall task may be accomplished. In order to subdivide the overall data processing task effectively, and to ensure that necessarily precedent tasks are completed before subsequent tasks are initiated, it is common to select one of CPUs 11-12 as a coordinator CPU and to make all of the other CPUs subordinate CPUs. In this way, the effective and efficient coordination of all of the CPUs can be assured by allowing only the coordinator CPU to control task subdivision and sequencing, and force all of the subordinate CPUs to follow the directions of the coordinator CPU.

Having selected one of CPUs 11-12 as the coordinator CPU, the problem remains as to what happens when the coordinator CPU malfunctions. Without some failure strategy, the entire multiprocessing system of FIG. 1 could be disabled simply due to a failure in one CPU (which happens to be the coordinator CPU). One solution to this problem is to provide a single backup coordinator CPU which takes over in case of a failure in the primary coordinator CPU. A system using such a backup strategy is show in J. M. Carruet et al. U.S. Pat. No. 3,964,055, granted June 15, 1976. Another solution is to provide a separate hardware subsystem which polls each of the CPUs to determine which ones are operative, and then assigns the coordinator function to one of the operative CPUs and blocks the assignment of the remainder of the CPUs. Such a polling coordinator selection system is shown in B. B. Moore U.S. Pat. No. 3,806,885, granted Apr. 23, 1974. A failure in the polling mechanism, however, will also result in the disablement of the entire multiprocessing system.

A preferred failure strategy is to make all of CPUs 11-12 equally capable of performing the coordinator function, and to select one of CPUs 11-12 as coordinator by means of messages interchanged between the various CPUs. Unfortunately, the design and programming of such a message exchange system is slow, tedious and expensive, particularly in attempting to handle pluralities of simultaneous failures. It is essential that one, and only one, CPU be assigned as coordinator at all times, even in the presence of multiple simultaneous failures, or failures in any sequence.

Figure 2:
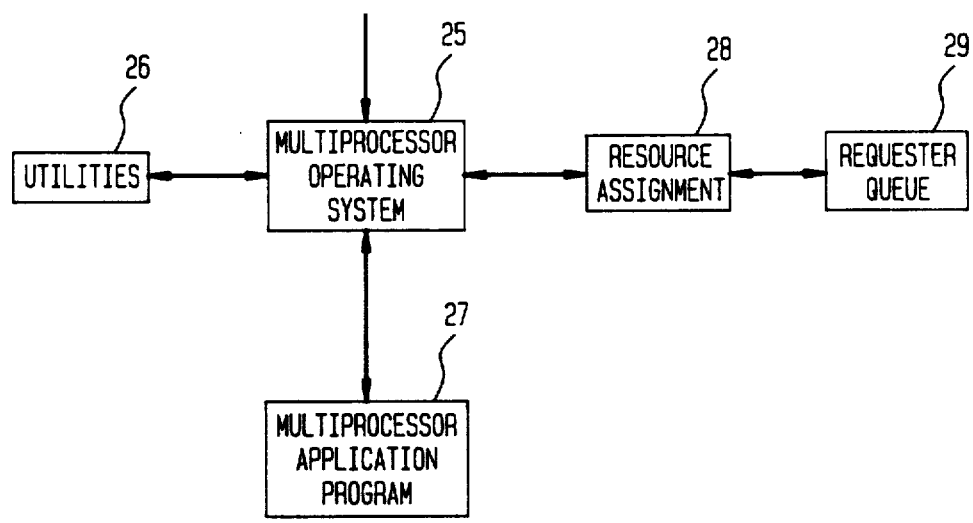
FIG. 2 shows a general block diagram of the software architecture for the multiprocessor computer system of FIG. 1 in which the present invention might find use.

In FIG. 2 there is shown a general block diagram of the software architecture for one of the CPUs 11-12 of a multiprocessing system such as that shown in FIG. 1. The software of FIG. 2 comprises a multiprocessor operating system 25 which controls the operation of the particular CPU in which it resides in such a manner as to permit cooperation with the other CPUs. Also included in FIG. 2 is a set of utility programs 26 which the operating system 25 uses to carry out the commands in the application program 27. Utility programs include such things as mathematical function libraries, sorters, compilers and data base manager packages.

A common utility available in many data base manager packages is a mutual exclusion resource assignment procedure 28 which serves to insure that one, and only one, component of the multiprocessor system of FIG. 1 has access to a shared resource at the same time. For example, CPUs 11-12 may all wish to access the common memory 20, but one, and only one, can be allowed to write into the common memory 20 at the same time. This prevents simultaneous changes to the same stored data by different users, which would render the contents of the memory ambiguous. A requester queue 29 is associated with resource assignment procedure 28 to maintain an ordered list of those components of the system of FIG. 1 requesting access to the shared resource so that requests can be served in the order received and that one, and only one, requester can be served at one time. Resource assignment procedures such as procedure 28 in FIG. 2 are well-known in the prior art and are exemplified by the aforementioned text by Raynal. In accordance with the present invention, this or any other well-known mutual exclusion resource assignment system can be used to control the assignment of coordinator status to one, and only one, of the CPUs 11-12 of FIG. 1.

Traditionally, resource "locks" in data processing systems allow a plurality of processes, executing on one or on a plurality of processors, to synchronize access to shared resources such as, for example, common memory 20 in FIG. 1. To accomplish this, the lock management system provides a queuing mechanism that allows requests to wait in a queue until the particular resource is available. Such locks are most often used to prevent simultaneous access to files or to peripheral devices.

In accordance with the present invention, the right to perform the coordination function in a multiprocessing system such as that shown in FIG. 1 is considered a resource, which resource can be controlled by the same common resource management system that is used to control the access to other system resources. In particular, all of the CPUs 11-12 which are capable of performing the coordination function provide continuous requests for the right to obtain exclusive assignment of the coordination function. Such an exclusive request is treated by the lockout management system in such a manner as to insure that the "resource" will be granted to no more than one requester at a time, all in accordance with standard and well-known lockout management principles. As a result, there can never be more than one CPU performing the coordination function.

In the event of a failure in the processor currently performing the coordination function, the continuous request for the coordination function from the failed CPU terminates. As a result, the lockout management system assigns the coordination function to the next available (queued) CPU. It is therefore possible to set the order of CPU selection for the coordination function by preselecting the order in which the requests are queued.

It can be seen that this mechanism for assigning the coordination function readily accommodates multiple failures by assigning the coordination function to the next CPU in the queue, regardless of the number, order or timing of the CPU failures. Moreover, any action which removes the request of a particular CPU from the queue (such as a voluntary maintenance shutdown) serves to prevent it from being selected as the coordinator. Finally, failure of the lockout mechanism itself leaves the previously assigned CPU as coordinator and thus allows the multiprocessor system to continue to function.

Figure 3:
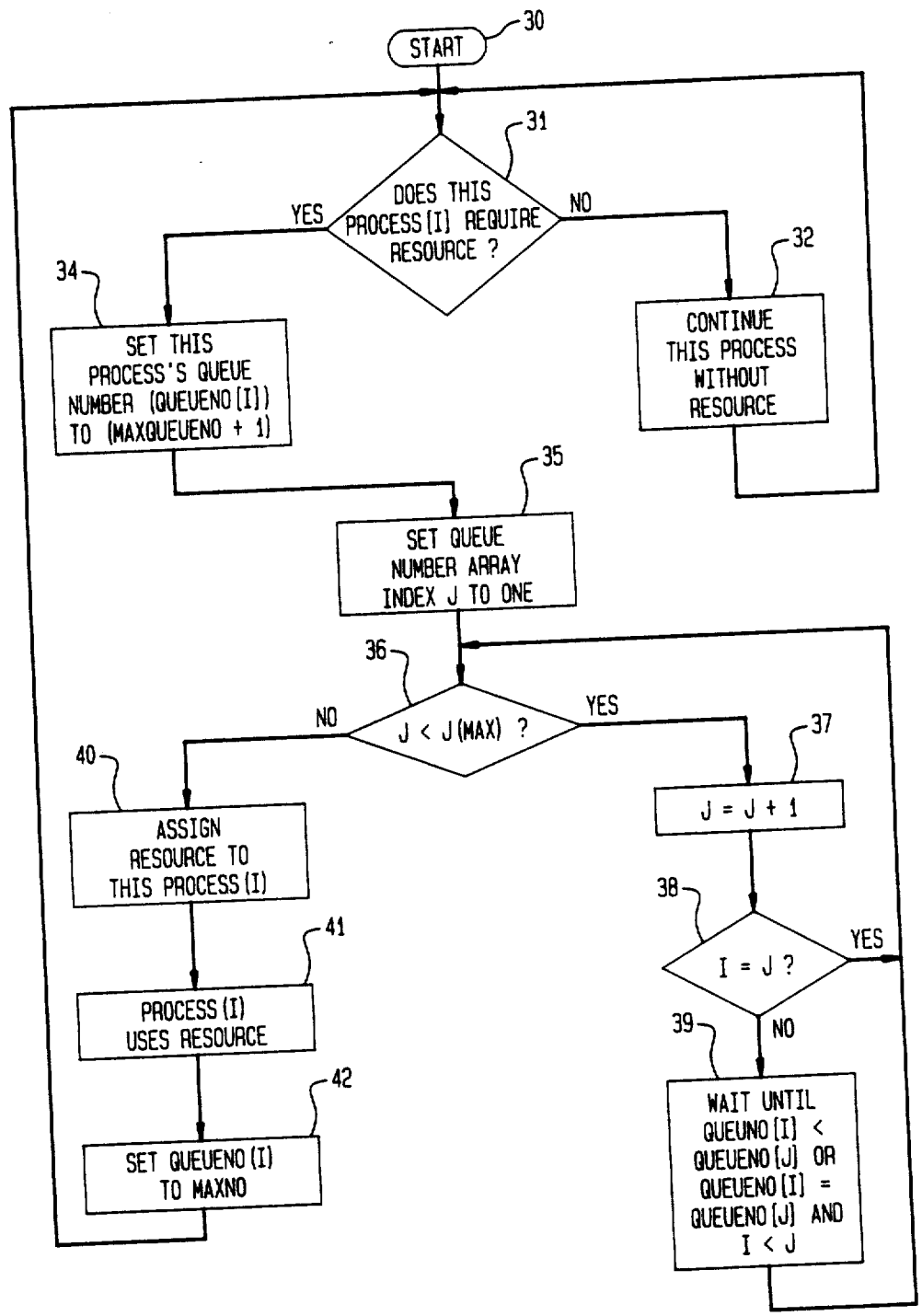
FIG. 3 shows a detailed flowchart for an illustrative mutual exclusion algorithm which might be used with the coordinator election system of the present invention.

One algorithm for exclusively assigning a resource to the "top" entry in a queue of requests for the resource is show in FIG. 3. The mutual exclusion resource assignment algorithm of FIG. 3 is found on pages 56 and 57 of the previously identified text by M. Raynal. A process implementing the algorithm of FIG. 3 is continually executing in each of the CPUsz 11, 12 of FIG. 1. The algorithm of FIG. 3 begins at start box 30 from which decision box 31 is entered. Box 31 determines whether this process requires a particular common resource (e.g., memory 20 in FIG. 1, or the right to be coordinator). If the resource is not currently required, box 32 is entered. In box 32, this process performs whatever functions it is designed to perform without the use of the resource, If this process does require the resource (and all of CPUs 11, 12 will require the "right-to-be-coordinator" resource), box 34 is entered. In box 34, the queue number for this process (in requestor queue 29 of FIG. 2) is set to one plus the maximum queue number already recorded in the queue 29, excluding the initializing queue number called MAXNO. The queue numbers, of course, determine the sequence in which the resource will be assigned to the requestors, the requestor with the lowest queue number receiving the assignment first, and so forth. All of the queue numbers are initialized to some highest possible number, called, as noted above, MAXNO, so that they are not assigned the resource until their queue number is set to some lower value.

It is, of course, possible that two requestors will simultaneously ascertain the same maximum queue number and assign the same queue number to the two requestors. As will be seen, the ambiguity thus arising can be resolved without ambiguity by preordering the requestors in any desired order prior to starting the system.

The requestor queue 29 is an array with a number of entries corresponding to the number of requestors (CPUs 11, 12 in FIG. 1). If J is an index into this array, then the value of J varies from 1 to J(MAX), where J(MAX) is the total number of requestors (CPUs). In box 35, the index J is set to "1" and decision box 36 is entered. If the current value of J is less than J(MAX), box 37 is entered where the value of J is imcremented by one. Thereafter, decision box 38 is entered to determine if J is equal to I, the index number of this process or CPU. If they are equal, decision box 36 is re-entered to test for the last entry in the array. If I and J are not equal, box 39 is entered, where the process simply waits until either the queue number for this process is less than the queue number for the Jth process or the queue numbers are the same, but the index number for this process (I) is less than the index number J. In either case, decision box 36 is re-entered and the loop 37-38-39 repeated until the last entry in the queue has been visited. At that point, decision box 36 is exited to box 40 where the resource is assigned exclusively to this process. In the context of the present invention, the right to be coordinator is assigned to this, the Ith, processor. In box 41 the resource is used or, in the case of the present invention, the coordination function is exercised, until no longer needed or no longer possible. At that time, box 42 is entered to set the queue number of this process to the highest possible number ("MAXNO"). As a result, the resource is reassigned to the processor with the lowest queue number.

As previously indicated, the resource assignment system of FIG. 3 can be used to assign the coordinator function to one and only one of the CPUs 11-12 of FIG. 1 by treating the coordinator assignment as a shared resource which can be assigned to only one requester at a time. One procedure for producing this result is the coordinator election procedure of FIG. 4. A computer program embodying the procedure of FIG. 4 is associated with each of the CPUs 11-12 of FIG. 1.

Figure 4:
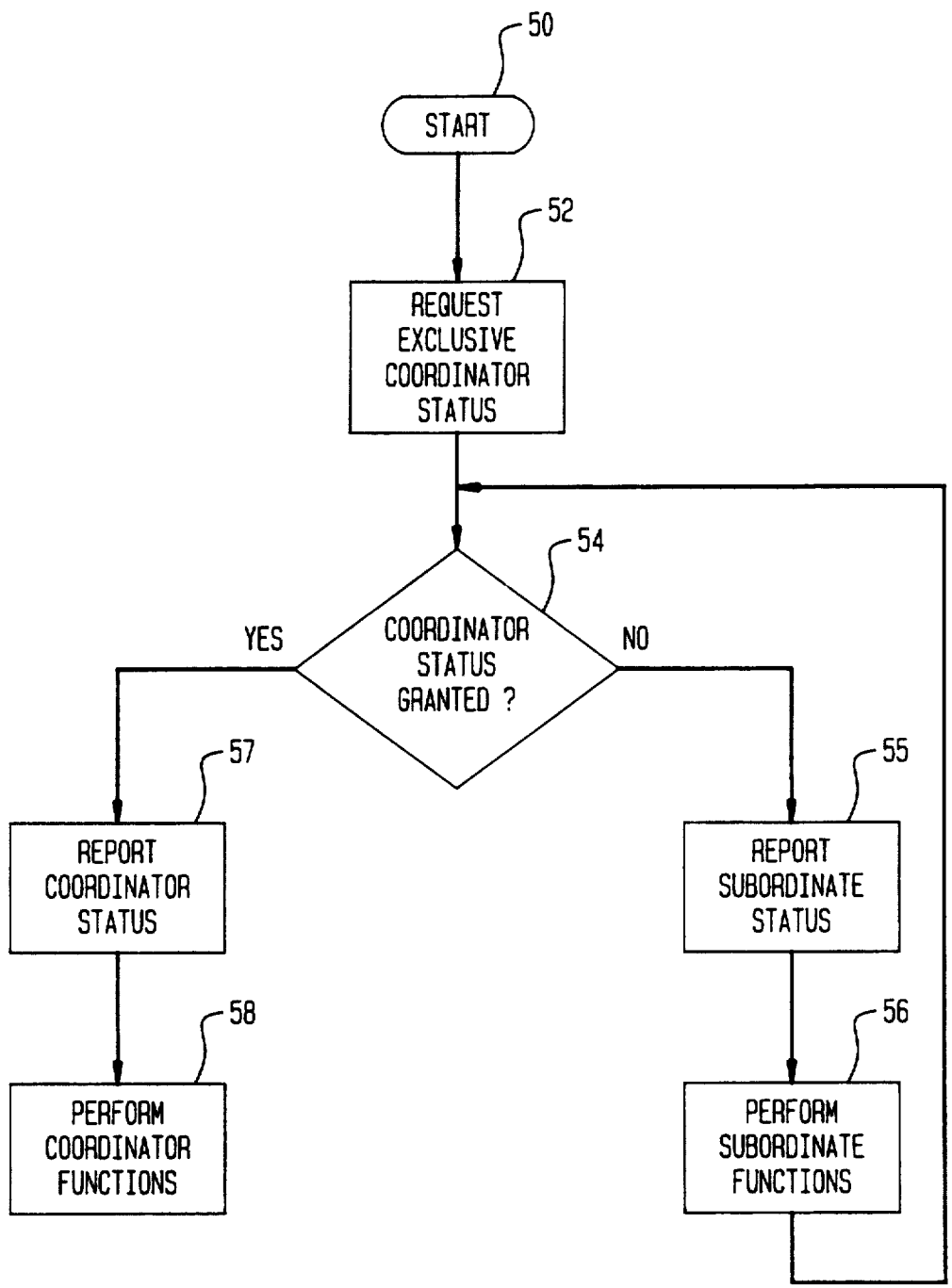
FIG. 4 shows a detailed flowchart of the coordinator election system in accordance with the present invention.

The coordinator election procedure of FIG. 4 begins in start box 50. Box 52 is then entered to request the coordinator status. It can thus be seen that all of the CPUs 11, 12 of FIG. 1 request the coordinator status when the system is started up. As was seen in connection with FIG. 3, queue numbers are assigned to the CPUs in the order that they are indexed in requestor queue 29 in FIG. 2 and thus this order can be preselected to control the sequence in which the CPUs are selected to be coordinator.

After the request to the coordinator is issued in box 52, decision box 54 is entered to determine whether the coordinator status has been granted to this particular processor. If the coordinator status has not been granted to this processor, box 55 is entered to report that this CPU is operating as a subordinate CPU. Thereafter, box 56 is entered to perform the appropriate subordinate functions. While performing these subordinate functions, decision box 54 is continually re-entered to determine if the coordinator function has subsequently been granted to this processor.

If this CPU is assigned the coordinator function by the resource assignment procedure of FIG. 3, decision box 54 is exited to box 57 where this CPU reports having coordinator status. Thereafter box 58 is entered to perform all of the coordinator functions.

It will be noted that the procedures of FIGS. 3 and 4 cooperate to assign the coordinator function to one, and only one, CPU in FIG. 1. Moreover, this assignment is unique despite the number, order or frequency of failures or deactivations of the CPUs. The order in which the coordinator assignment is given to the CPUs can be controlled by ordering the CPU index numbers in the requestor queue 29 of FIG. 2. Finally, the assignment is fail-safe in the sense that the failure of the assignment procedure 28 of FIG. 2 leaves the most recently assigned coordinator CPU in charge of coordination while the resource assignment procedure is corrected.

The resource assignment procedure of FIG. 3 and the coordinator election procedure of FIG. 4 are shown as pseudo-code in APPENDIX A hereto. The correspondence between the flowcharts and the pseudo-code are obvious and will not be further described here.

It should also be clear to those skilled in the art that further embodiments of the present invention may be made by those skilled in the art without departing from the teachings of the present invention.

---

APPENDIX

Pseudo-Code for Mutual Exclusion Algorithm

```
main( )
{
        if resource_needed;
        {
        then
        {
            queueno[I]=0;
            queueno[I]=1 + MAXQUEUENO;
            for J=0 to J(MAX), I≠J;
            {
            wait least(queueno[I], queueno[J]);
            }
            use_resource( );
            queueno[I]=MAXSIZE;
        }
        else
        {
            not_use_resource( );
        }
        }
}
```

Pseudo-Code Coordinator Election Algorithm

```
main( )
{
        assert(COORDINATOR_LOCK is not granted);
        post_lock_request( name=COORDINATOR_LOCK,
            mode=EXCLUSIVE,
            asynchronous_notification_rtn
            =notify_lock_granted( ));
        if(COORDINATOR_LOCK is not granted
        {
        report("I AM SUBORDINATE");
        do while (COORDINATOR_LOCK is not granted)
        {
        perform_subordinate_function( );
        }
        }
        report("I AM COORDINATOR");
        perform coordinator_functions( );
}
notify_lock_granted( )
{
        assert(COORDINATOR_LOCK is granted);
}
```

---

What is claimed is:

1. A multiprocessor computer control system including a plurality of processors coordinated at any given time by one and only one of said processors, said multiprocessor computer control system comprising means, included in each processor of said plurality of processors and operative only while said each processor is operative, for resource allocation and comprising mutually exclusive resource access and lockout facilities, means for generating from each processor of said plurality of processors requests to assume the multiprocessor coordination function to coordinate processor tasks, means for queuing said requests for the processor coordination function, means including said mutually exclusive resource access and lockout facilities and responsive to said requests for assigning the multiprocessor coordination function to one, and only one of said plurality of processors, means included in each processor of said plurality of processors and operative in the assigned one of said plurality of processors, for coordinating the operation of said multiprocessor computer control system, and means for reporting to said plurality of processors, other than said assigned one of said plurality of processors, said assigning of the multiprocessor coordinator function to said one of said plurality of processors.

2. A method for assigning the coordinating function to one and only one processor of a multiprocessor computer control system, said method comprising the steps of generating by each processor of said plurality of processors when said each processor is operative, requests to assume the multiprocessor coordination function to coordinate processor tasks, invoking in each processor of said plurality of processors, a mutually exclusive resource access and lockout facility, queuing said requests, assigning in response to said requests the multiprocessor coordination function to one, and only one, of said plurality of processors using said mutually exclusive resource access and lockout facility, reporting the assignment of said coordination function to each of said plurality of processors other than said assigned one of said plurality of processors, and coordinating the operation of said multiprocessor computer control system by said assigned one of said plurality of processors.

\* \* \* \* \*